(12) United States Patent
Dubost et al.

(10) Patent No.: US 7,506,414 B2
(45) Date of Patent: Mar. 24, 2009

(54) FASTENER FOR FIXING TWO COMPONENTS TO EACH OTHER

(75) Inventors: Dominique Dubost, La Celle St Cloud (FR); Helder De Azevedo, Sainville (FR)

(73) Assignee: ATTAX, Paris (FR)

( * ) Notice: Subject to any disclaimer, the term of this patent is extended or adjusted under 35 U.S.C. 154(b) by 0 days.

(21) Appl. No.: 11/037,035

(22) Filed: Jan. 19, 2005

(65) Prior Publication Data

US 2005/0155190 A1 Jul. 21, 2005

(30) Foreign Application Priority Data

Jan. 21, 2004 (FR) .................................. 04 00555

(51) Int. Cl.
*F16B 2/20* (2006.01)
*F16B 2/24* (2006.01)
*F16B 5/12* (2006.01)

(52) U.S. Cl. ......................................... 24/293; 24/295

(58) Field of Classification Search .................. 24/297, 24/336, 293, 295, 294; 52/714, 717, 716.5, 52/211

See application file for complete search history.

(56) References Cited

U.S. PATENT DOCUMENTS

| 3,631,569 A | * | 1/1972 | Seckerson et al. ............. 24/295 |
| 5,288,121 A | * | 2/1994 | Graves ..................... 296/146.9 |
| 5,347,690 A | * | 9/1994 | Mansoor et al. ............... 24/295 |
| 5,636,408 A | * | 6/1997 | Dichtel ............................. 16/6 |
| 5,953,803 A | * | 9/1999 | Hahn ....................... 29/243.56 |
| 6,234,835 B1 | * | 5/2001 | Bakker et al. ................ 439/553 |
| 6,327,758 B1 | * | 12/2001 | Petrakis et al. ................. 24/546 |
| 6,625,941 B2 | * | 9/2003 | Shaw .......................... 52/211 |

FOREIGN PATENT DOCUMENTS

| DE | 682 184 A1 | 11/1995 |
| EP | 262 282 A1 | 4/1988 |
| GB | 2 160 579 A1 | 12/1986 |
| GB | 2 191 814 A1 | 12/1987 |

\* cited by examiner

*Primary Examiner*—Robert J Sandy
(74) *Attorney, Agent, or Firm*—Sughrue Mion, PLLC

(57) ABSTRACT

This fastener is characterized in that it comprises a clip-like portion (5) which is suitable for being resiliently hooked to an edge of the first component (2) and from one branch of which at least two hooking lugs (6, 7) extend, the first (7) of which comprises a folded portion which is provided with means (9) for hooking to the first component (2), and the second (6) of which comprises means (8), in the form of a resilient hook for passing an over-center position, for hooking the fastener, and therefore the first component (2), to an edge of a slot (4) of the second component (3).

9 Claims, 1 Drawing Sheet

FASTENER FOR FIXING TWO COMPONENTS TO EACH OTHER

BACKGROUND OF THE INFORMATION

1. Field of the Invention

The present invention relates to a fastener for fixing two components to each other.

2. Background Art

Fasteners of this type have a number of uses, in particular in the automotive industry, for fixing two pieces of equipment of a vehicle to each other.

From the prior art, resilient fasteners of this type are known which are generally V-shaped and which comprise an intermediate portion from which lateral flaps extend.

These lateral flaps of the fastener are therefore provided with means which form an external lug comprising means in the form of a resilient hook for passing an over-centre position, for hooking the fastener to the edges of a slot, for example, of a first component, and means which form an inner lug and which are provided with means for hooking the second component in order to fix this second component to the first.

In the prior art, the means which form the inner lug of the fastener extend from the intermediate portion thereof, over part of the height of the means which form the outer lug and define a passage for receiving the second component.

However, fasteners of this type have a given number of disadvantages, in particular with regard to the spatial requirement thereof and owing to the fact that, in some applications, the space available for fixing the two components to each other is not sufficient to allow a fastener of this type to be used.

The object of the invention is therefore to overcome these problems.

SUMMARY OF THE INVENTION

To this end, the subject-matter of the invention is a resilient fastener for fixing two components to each other, characterised in that it comprises a clip-like portion which is suitable for being resiliently hooked to an edge of the first component and from one branch of which at least two hooking lugs extend, the first of which comprises a folded portion which is provided with means for hooking to the first component, and the second of which comprises means, in the form of a resilient hook for passing an over-centre position, for hooking the fastener, and therefore the first component, to an edge of a slot of the second component, and in that it comprises a single central second lug, at both sides of which a first lug is provided.

According to other features:

- the ends of the folded portions of the first lugs are connected to the first component by means of a hooking plate;
- the hooking plate comprises hooking means in the form of a harpoon;
- the hooking plate is suitable for being supported against the stopping means of the first component;
- the stopping means are formed by raised portions of the first component;
- the stopping means are formed by an edge of a slot of the first component;
- the stopping means is formed by a shoulder of the first component;
- the folding zone of the or each first lug is located in the region of the resilient-hook-like means of the second lug;
- it is formed from a single component from a sheet metal blank by means of cutting and formation thereof; and
- the clip-like portion comprises means in the form of a harpoon.

BRIEF DESCRIPTION OF THE DRAWINGS

The invention will be better understood from a reading of the following description, given purely by way of example and with reference to the appended drawings, in which.

DETAILED DESCRIPTION OF THE INVENTION

Figure 1:
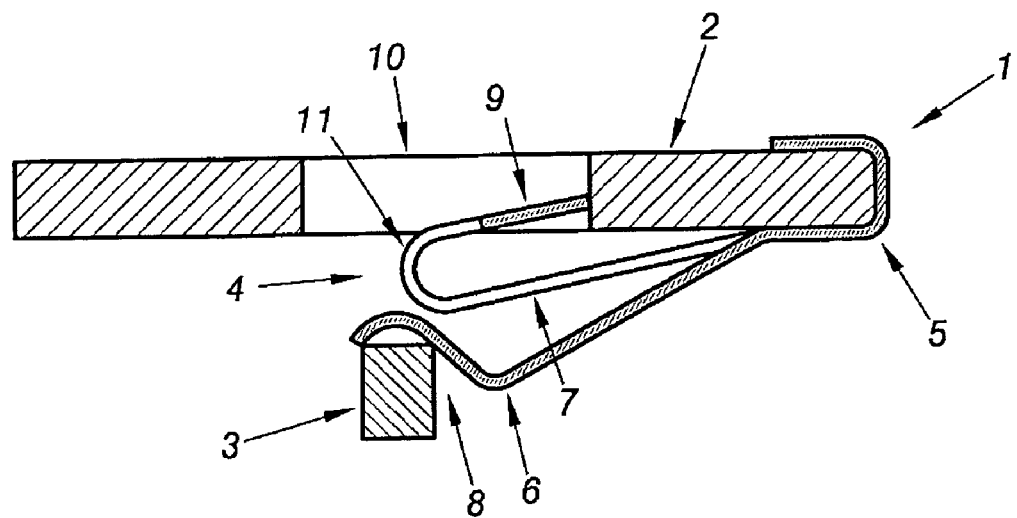
FIG. 1 is a side view of a resilient fastener according to the invention, in the position for assembling and fixing two components to each other.

These Figures illustrate a resilient fastener which is generally designated 1 and which allows two components to be fixed to each other, these components being formed, for example, by pieces of equipment of a motor vehicle.

One of the components is generally designated 2 in these Figures, whilst the other component is generally designated 3.

The second component, such as, for example, component 3, comprises a slot which is generally designated 4 and in which the fastener 1 is engaged. The first component, for example 2, is in turn hooked to the fastener 1.

To this end, this resilient fastener comprises a clip-like portion which is generally designated 5 and which is suitable for being resiliently hooked to an edge of the first component 2 and from which at least two hooking lugs extend and are generally designated 6 and 7.

In the embodiment illustrated, three hooking lugs extend from the corresponding branch of the clip. One of these lugs is a single central lug which is generally designated 6 and which comprises resilient hook-like means, generally designated 8 in these Figures, for passing an over-centre position and for hooking the fastener, and therefore the first component, to an edge of the slot of the second component.

A lug for hooking the fastener to the first component 2 is provided at each side of this single central lug 6.

Figure 2:
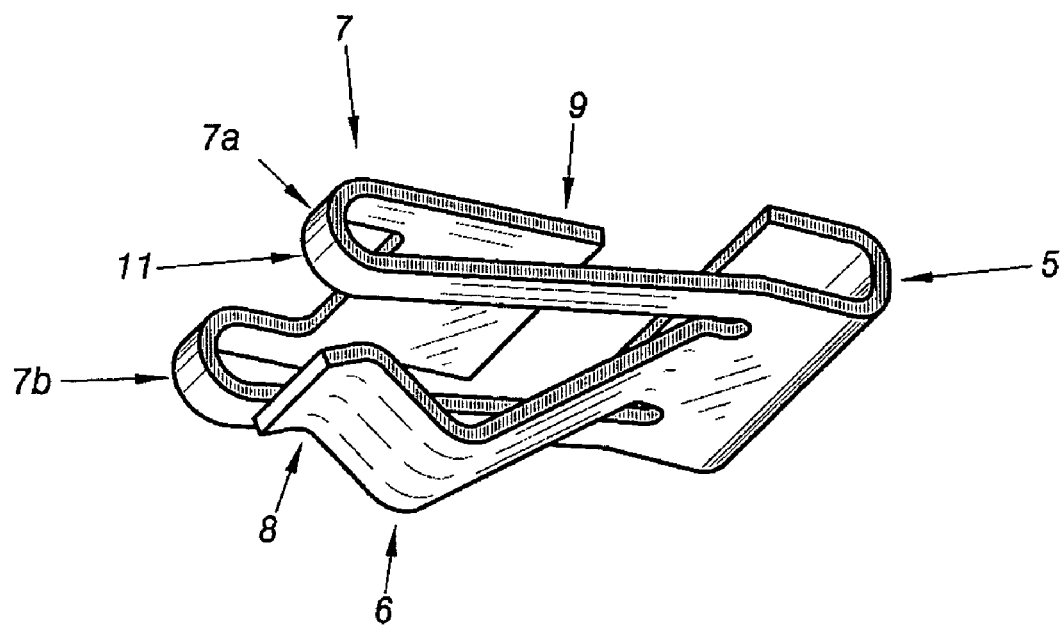
FIG. 2 is a perspective view of a fastener of this type.

In fact, as can be seen more clearly in FIG. 2, the hooking lug 7 has two lateral lug portions 7a and 7b and each of these lug portions 7a, 7b comprises a folded portion 11 which is provided with means for hooking to the first component 2.

In fact, the folded ends of these first lateral lug portions 7a and 7b are connected by means of a hooking plate which is generally designated 9.

This hooking plate 9 is therefore suitable for co-operating with complementary means of the first component 2 in order to ensure that the fastener is locked thereon.

There are various possible embodiments of this hooking means.

This hooking means can thus, for example, be formed by harpoon-like elements of this hooking plate.

In the embodiment illustrated, this hooking plate is suitable for being supported against stopping means of the first component 2.

As illustrated, this stopping means is formed, for example, by an edge of a slot 10 of the first component 2.

Of course, this stopping means may be formed by raised portions of this first component which have forms different from a slot.

In this manner, for example, a shoulder is also possible.

It should also be noted that the folded portion 11, for example, of the lug, or of each of the lateral first lug 7a, 7b, is located in the region of the resilient-hook-like means 8 for passing an over-centre position of the other lug.

It will therefore be appreciated that a fastener of this type has a given number of advantages, in particular with regard to retaining the second component in position relative to the first in a play-free manner and the possibility of using a fastener of this type when there is limited space available between the two components.

Of course, other embodiments of this fastener are also possible and it should be noted that this fastener can be produced from a single component by means of cutting and formation, for example, of a sheet metal blank.

Thus, for example, the clip-like portion can also comprise harpoon-like means for retaining the portion on the corresponding component.

The invention claimed is:

1. In combination, first and second components and a resilient fastener for fixing said first and second components to each other, wherein said fastener comprises a clip portion which is resiliently hooked to an edge of the first component and from one branch of which one central and two lateral hooking lugs extend, the central lug being a single lug at opposite sides of which extend the lateral lugs, said central lug being directly connected to said clip portion and comprising means, in the form of a resilient hook for passing an over-centre position, for hooking the fastener, and therefore the first component, to an edge of a slot of the second component and said lateral lugs being connected by means of a hooking plate which cooperates with complementary means of the first component in order to ensure that the fastener is locked thereon.

2. The fastener according to claim 1, wherein the hooking plate is in the form of a hook.

3. The fastener according to claim 1, wherein the hooking plate is adapted to being supported against a stop of the first component.

4. The fastener according to claim 3, wherein said ends of said respective folded portions are connected to the first component by said hooking plate, and wherein said hooking plate is supported against said stop of the first component.

5. The fastener according to claim 3, wherein the stop is formed by raised portions of the first component.

6. The fastener according to claim 5, wherein the stop is formed by an edge of a slot of the first component.

7. The fastener according to claim 5, wherein the stop is formed by a shoulder of the first component.

8. The fastener according to claim 1, wherein the folded portion of each lateral first lug portion is located in a region of the resilient hook of the second lug.

9. The fastener according to claim 1, wherein it is in the form of a single component cut from a sheet metal blank.

* * * * *